United States Patent
Nakatsuka et al.

(10) Patent No.: US 8,318,058 B2
(45) Date of Patent: Nov. 27, 2012

(54) METHOD FOR MANUFACTURING MOLD FOR MOLDING OPTICAL ELEMENT

(75) Inventors: Yuzo Nakatsuka, Tachikawa (JP); Atsushi Naito, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 260 days.

(21) Appl. No.: 12/441,683

(22) PCT Filed: Aug. 17, 2007

(86) PCT No.: PCT/JP2007/066023
§ 371 (c)(1), (2), (4) Date: Mar. 17, 2009

(87) PCT Pub. No.: WO2008/035521
PCT Pub. Date: Mar. 27, 2008

(65) Prior Publication Data
US 2009/0278270 A1 Nov. 12, 2009

(30) Foreign Application Priority Data
Sep. 20, 2006 (JP) ................ 2006-253809

(51) Int. Cl.
*B29D 11/00* (2006.01)
(52) U.S. Cl. ............ 264/2.5; 264/39; 264/219
(58) Field of Classification Search .......... 264/1.1, 264/2.5, 2.7, 39, 219; 425/808, 810
See application file for complete search history.

(56) References Cited

U.S. PATENT DOCUMENTS
6,174,453 B1 * 1/2001 Harada ............ 252/62.54

FOREIGN PATENT DOCUMENTS
| JP | 5-104536 | 4/1993 |
|---|---|---|
| JP | 2002-96335 | 4/2002 |
| JP | 2004-175112 | 6/2004 |
| JP | 2005-161798 | 6/2005 |

OTHER PUBLICATIONS

Taiwan Patent Office, Notice of Examination Opinion in Application No. 096134707, Dated Apr. 10, 2012, 4 pages.

* cited by examiner

*Primary Examiner* — Mathieu D. Vargot
(74) *Attorney, Agent, or Firm* — Finnegan, Henderson, Farabow, Garrett & Dunner, L.L.P.

(57) ABSTRACT

A method for manufacturing a mold for molding an optical element, wherein the mold comprising a base material having a molding base face and a covering layer provided on the molding base face of the base material, and an upper surface portion of the covering layer located above the molding base face forms a molding face, the method including: a covering step for forming a covering layer on the molding base face of the base material; a pressurizing step for pressurizing a surface of the covering layer; and a high-precision processing step for forming a molding face by applying high-precision processing onto the surface of the covering layer subsequent to the pressurizing step.

11 Claims, 4 Drawing Sheets

METHOD FOR MANUFACTURING MOLD FOR MOLDING OPTICAL ELEMENT

FIELD OF THE INVENTION

The present invention relates to a method for manufacturing a mold for molding an optical element wherein an optical element such as an optical lens and diffraction grating is manufactured by resin injection molding, particularly a method for manufacturing a mold for molding an optical element wherein the optical element is required to provide high precision on the order of a micron or below.

BACKGROUND OF THE INVENTION

To mold an optical element by injection molding of a synthetic resin, a mold of a metallic material such as steel has been used in the conventional art. In recent years, the optical element is required to provide high precision on the order of a micron or below due to the trend towards microstructure and the high precision of optical products. The conventional mold has failed to meet the requirements for such high precision transferability. To meet the requirements for molding such a high-precision optical element, Patent Document 1 discloses a mold for molding an optical element wherein a heat insulating layer and surface treatment layer are formed on the surface of a stainless steel core mold.

According to the mold for molding the optical element described in this document, a ceramic material is sprayed on the surface of the core mold, and a heat insulating layer is formed integrally with the mold base material. A nonferrous metal material is electroless-plated on the heat insulating layer. This procedure is said to allow a high-precision metallic structure to be formed on the surface treatment layer, whereby a molded product having minimized geometric error is produced.

Patent Document 1: Japanese Unexamined Patent Application Publication No. 2002-96335

DISCLOSURE OF INVENTION

Problems to be Solved by the Invention

In the aforementioned mold for an optical element, however, the process of increasing and decreasing the temperature is repeated to mold the optical element and this may cause separation between the layers. Separation tends to occur particularly between the heat insulating layer made of ceramics and the surface treatment layer of nonferrous metal due to the differences in the thermal expansion coefficient. Even partial separation may cause a minute distortion or misalignment on the surface treatment layer, and may lead to the deteriorated geometric precision of a molded product.

Further, the material selected to form the heat insulating layer is required to have various properties. When stability, heat insulation, cost efficiency, and productivity are taken into account, a material with insufficient hardness or density may have to be selected. When exposed to the pressure or heat of resin at the time of the molding operation, the heat insulating layer using such a material may be subjected to a change in shape by the continuous molding operation. If the heat insulating layer is subjected to a change in shape, the geometric precision of the molded product will be reduced.

The present invention has been made to solve the aforementioned problems found in the conventional method for manufacturing a mold for molding an optical element. To be more specific, the object of the present invention is to provide a method for manufacturing a mold for molding an optical element wherein a change in the shape of the heat insulating layer during the continuous molding operation is prevented, and high-precision transferability is ensured.

Means for Solving the Problems

The method for manufacturing a mold for molding an optical element in the present invention made to solve the aforementioned problems is a method for manufacturing a mold for molding an optical element, wherein a base material having a molding base face and a covering layer provided on the molding base face of the base material are provided, and the upper portion of the covering layer on the molding base face of the base material forms a molding face, this method including:

a covering step for forming a covering layer on the molding base face of the base material;

a pressurizing step for pressurizing the surface of the covering layer; and a high-precision processing step for forming a molding face by applying high-precision processing onto the surface of the covering layer subsequent to the pressurizing step.

According to the method for manufacturing a mold for molding an optical element in the present invention, a covering layer is formed on the molding base face of the base material in the covering step, and the surface of the covering layer is pressurized in the pressurizing step. Further, in the high-precision processing step, precision processing is applied onto the surface of the covering layer subsequent to the pressurizing step. Thus, even if a material with insufficient hardness or density is selected for part of the covering layer, a change in shape is caused in advance in the pressurizing step. Accordingly, no big change in shape occurs after the high-precision processing step. This arrangement provides a method for manufacturing a mold for molding an optical element wherein a change in the shape of the heat insulating layer is prevented during the continuous molding operation, and high-precision transferability is ensured. In this case, the "covering layer provided on the molding base face of the base material" can be a covering layer of a multilayer structure (made up of a bond layer, heat insulating layer, intermediate layer, surface layer, etc.). The "surface of the covering layer" refers to the topmost layer.

Further, in the present invention, the covering layer preferably contains a heat insulating layer including ceramic. Ceramic is characterized by its excellent heat insulation capacity and is often employed as a heat insulating layer.

In the pressurizing step, the applied pressure is preferably kept within the range from 30 through 400 MPa. It is also preferred that adequate pressure should be applied to the heat insulating layer to cause deformation, and that the pressure should be kept within the range that does not adversely affect other layers.

The pressure is applied preferably for a total of ten minutes or more in the pressurizing step. Abrupt pressure applied for a short time may cause uneven deformation of the heat insulating layer, and should be avoided. The maximum time of 40 hours is sufficient to apply pressure.

The temperature at the time of applying pressure in the pressurizing step is preferably 20 through 400° C. The preferred temperature range is such that adequate deformation occurs without excessive thermal load being applied to the heat insulating layer.

In the present invention, dummy molding is preferably performed in such a way that the relevant mold is fitted with the counterpart mold member, the molten molding material is injected into a molding space, and pressure is applied in the pressurizing step. In the dummy molding operation, the optical element producing mold is pressurized in almost the same manner as in the actual molding operation.

Further, in the pressurizing step of the present invention, the pressure applied is preferably equal to or higher than the pressure applied in the normal molding operation. More preferably, the pressure applied should be higher than the pressure applied in the normal molding operation by 25 MPa or more. This arrangement ensures correct deformation of the heat insulating layer.

The number of shots is preferably 1,000 or more. Deformation of the heat insulating layer will be virtually completed by a molding operation of 1,000 shots or more.

The pressure application time per shot is preferably equal to or longer than the pressure application time per shot in the normal molding operation. This arrangement permits sufficient pressure to be applied until the molten molding material is solidified and the core cannot be pressurized.

In the pressurizing step of the present invention, the number of shots is preferably 2,000 or more. Deformation of the heat insulating layer is fully ensured by a molding operation with 2,000 shots or more.

Further, the present invention permits the relevant mold to be placed inside a pressurizing container in the pressurizing step, wherein pressure is applied to the pressurizing container. This arrangement also ensures that the adequate pressure is applied.

In the pressurizing step according to the present invention, pressure is preferably applied when the portion of the mold except for the molding face is covered with a covering member. This arrangement permits pressure to be applied to the molding face alone, without other portions being affected.

Effect of the Invention

The method for manufacturing a mold for molding an optical element prevents a change in the shape of the heat insulating layer during the continuous molding operation, and provides high-precision transferability.

LEGEND

Figure 1:
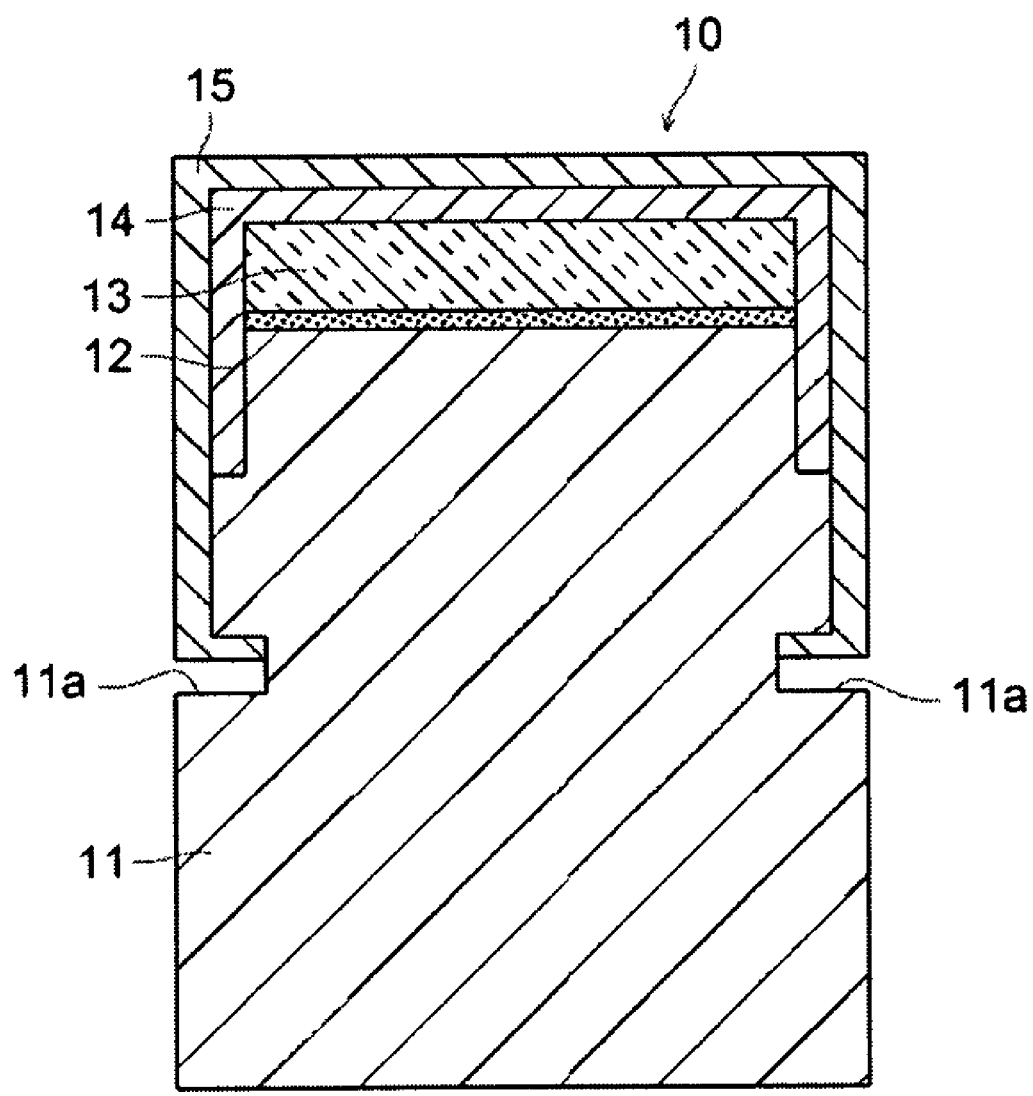
FIG. 1 is a cross sectional view of the structure of a mold for molding an optical element in the present embodiment.

10. Optical element producing mold
11. Base material
13. Heat insulating layer
15. Surface treatment layer
24. Pressurizing furnace
25. Cover member

DETAILED DESCRIPTION OF THE PREFERRED EMBODIMENT

Referring to the attached drawings, the following describes the details of the best mode for carrying out the present invention. This embodiment applies to the mold for molding an optical element such as an optical lens and diffraction optical element.

As shown in FIG. 1, the optical element producing mold 10 of the present embodiment includes a base material 11, bond layer 12, heat insulating layer 13, intermediate layer 14, and surface treatment layer 15 which are laminated in that order sequentially from the bottom of the drawing. The upper surface of the base material 11 in the drawing serves as a molding base face, and the front end is negatively offset. Further, this mold is also provided with a groove 11a used for gripping at the time of maintenance and inspection. The approximate shape of a molded product is formed by this base material 11. In the present embodiment, the cover layer consists of the bond layer 12, heat insulating layer 13, intermediate layer 14, and surface treatment layer 15 provided on the upper portion of the base material 11 in the drawing. The surface of the surface treatment layer 15 as the topmost surface thereof corresponds to the surface of the cover layer. The upper surface of treatment layer 15 forms a molding surface.

The bond layer 12 is undercoated to enhance adhesion between the base material 11 and heat insulating layer 13. The heat insulating layer 13 is made up of a ceramic material. This is intended to prevent the heat of the resin material from being released to the base material 11, and the temperature from rapidly falling at the time of injection molding of an optical element. The heat insulating layer 13 is finished by machining to a desired shape, whereby the thickness of the heat insulating layer 13 is made free of variation. This procedure provides an edge without sagging on the periphery and enhances molding transferability on the periphery. This also allows the neighboring intermediate layer 14 to be made thinner.

The intermediate layer 14 is intended to improve adhesion between the heat insulating layer 13 and surface treatment layer 15. The heat insulating layer 13 is made of ceramic material, and the surface treatment layer 15 is made of metallic material. Accordingly, the intermediate layer 14 is preferably made of a material characterized by high conformability with these materials. The upper surface of the surface treatment layer 15 in FIG. 1 is machined to form a molding surface thereon. This surface treatment layer 15 is preferably made of a metallic material. Use of a nonferrous metal such as nickel is particularly preferable.

Figure 2:
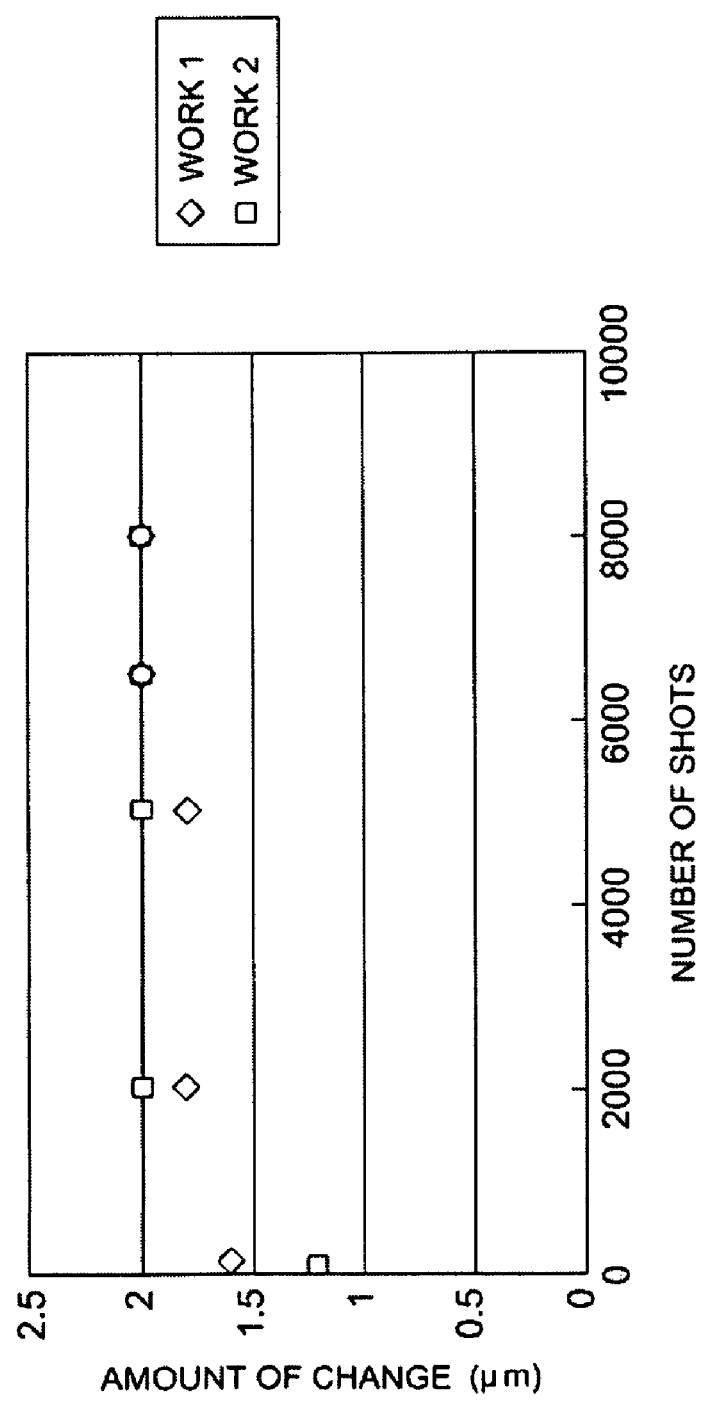
FIG. 2 is a chart graphically representing the relationship between the number of shots and the amount of change in a mold.

The optical element producing mold 10 having the aforementioned structure is known to be deformed to some extent by continuous molding operations. In the experiment made by the present inventors, the relationship shown in FIG. 2 has been observed between the number of shots in the continuous molding operation and the amount of change in the mold. To be more specific, there is a sudden increase in the amount of change in the initial phase at the beginning of molding. When the amount of change has reached a certain level, deformation does not easily occur. On the workpiece used in this test, a big deformation was recorded during the process from the start of molding through about 2,000 shots. After that, almost no deformation was witnessed up to 8,000 shots or thereabout. The test has also revealed that deformation mainly occurs to the heat insulating layer 13.

In the present embodiment, the following three steps are taken in that order, whereby the optical element producing mold 10 is manufactured:
(1) Covering step
(2) Pressurizing step
(3) High-precision processing step The optical element producing mold 10 of the present embodiment refers to what is commonly called a core. It is built in the base metal of the injection molding machine, and forms a high-precision cavity.

In the covering step (1), the bond layer 12, heat insulating layer 13, intermediate layer 14, and surface treatment layer 15 are laminated in that order onto the base material 11 with a molding base face formed thereon. A conventional material can be used as the material of these layers. Any of them can be omitted, or another layer can be added, as required. At this time, high-precision processing is not yet applied to the surface of the surface treatment layer 15. The overall shape as a metallic core is already created, and this layer can be built into the base mold of the injection molding machine under these conditions.

In the pressurizing step (2), pressure is applied to the surface covered in step (1) (the surface of the surface treatment layer 15 in this case). Pressure can be applied only in the direction approximately perpendicular to the molding face (in a downward direction in the case of FIG. 1). In the present embodiment, pressure is applied under the pressurizing conditions meeting the following requirements:

Applied pressure: 30 through 400 MPa

Total pressure application time: 10 minutes through 40 hours

Temperature when pressure is applied: 20 through 400° C.

If pressure is applied under the conditions meeting the aforementioned requirements, the heat insulating layer 13 can be deformed in advance. This is intended to ensure that there are almost no deformations during the molding phase.

If the applied pressure is lower than 30 MPa, the heat insulating layer 13 is not sufficiently deformed. If the applied pressure is higher than 400 MPa, the base material 11 may also be deformed. This is to be avoided. Further, if the total pressure application time is shorter than 10 minutes, the heat insulating layer 13 will not be sufficiently deformed. If the total pressure application time is longer than 40 hours, this is only a waste of time since the deformation of the heat insulating layer 13 has already been completed. Further, if the temperature at the time of pressure application is lower than 20° C., there will be departure from the actual usage conditions of the mold. This must be avoided. If the temperature during pressure application is higher than 400° C., adverse effects such as cracks or separation may occur to each layer of the optical element producing mold 10 and to the boundaries of these layers due to thermal shocks. This is to be avoided.

In the high-precision processing step (3), high-precision processing is applied to the surface of the covering layer subsequent to the pressurizing step. To be more specific, the molded shape is formed, for example, by precision cutting, on the surface serving as a molding face (upper surface in FIG. 1), out of the surfaces of the surface treatment layer 15. The precision processing includes a cutting operation such as fly-cutting, shaping or turning, a grinding operation such as elite grinding, and a polishing operation such as lapping. An appropriate operation is selected from among these operations, and processing is performed, whereby the molding surface can be precision-shaped. This procedure produces the optical element producing mold 10 in the present embodiment.

In the optical element producing mold 10 in the present embodiment produced by the aforementioned steps (1) through (3), the heat insulating layer 13 is subjected to initial deformation, whereby deformation in the subsequent molding operation can be prevented. Of these steps; the covering step (1) and high-precision processing step (3) are the same as the conventional steps. Thus, the following describes the further details of the pressurizing step (2) characterizing the present embodiment.

Figure 3:
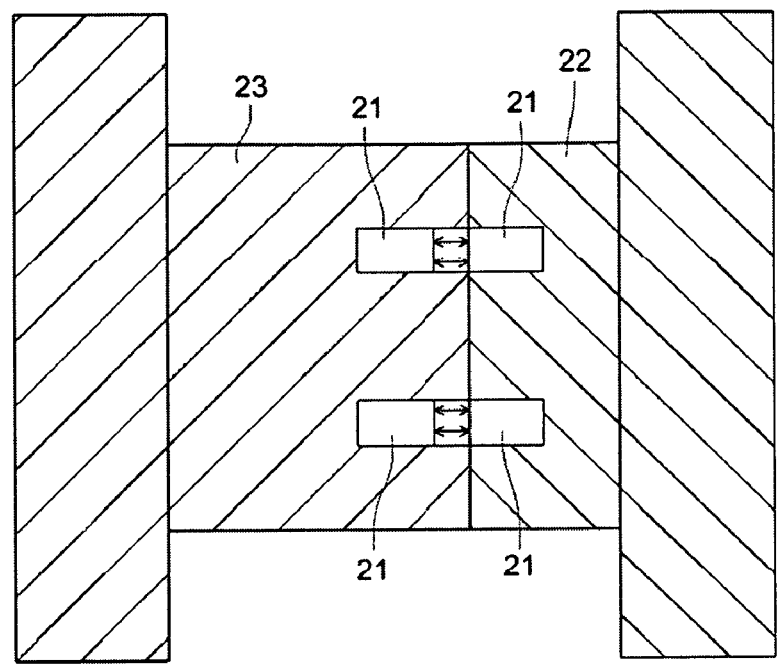
FIG. 3 is an explanatory diagram representing the dummy molding operation.

The following describes an example of the processing method in the pressurizing step (2) meeting the aforementioned requirements. Either one of the following two methods (A) or (B) are preferably used as a specific method for the pressurizing step (2):

A) Dummy molding (FIG. 3)

Figure 4:
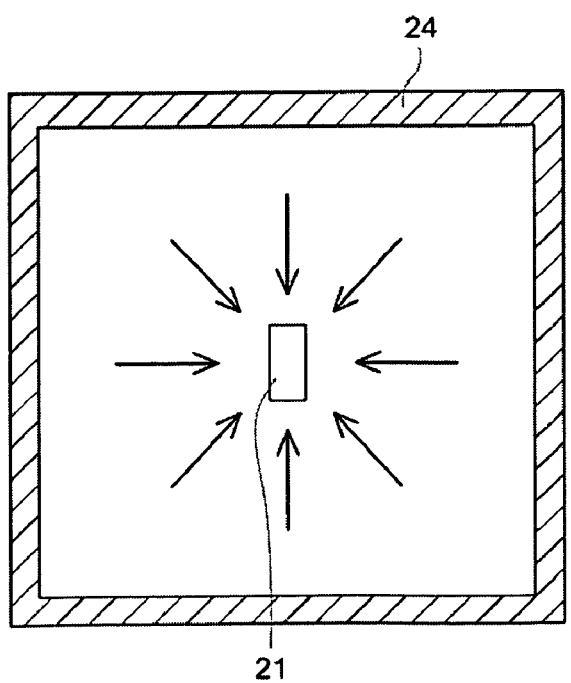
FIG. 4 is an explanatory diagram showing the process of holding in a pressurizing furnace.
Figure 5:
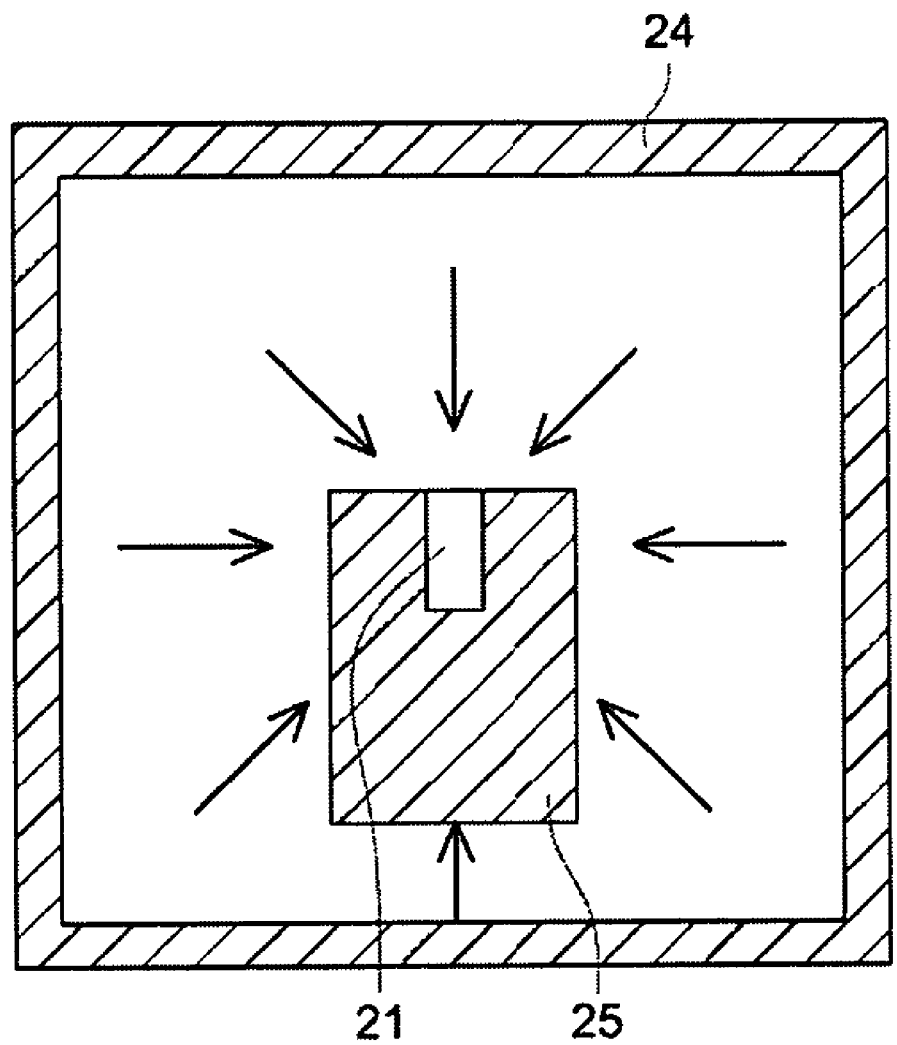
FIG. 5 is an explanatory diagram showing the process of holding in a pressurizing furnace.

B) Holding in the pressurizing furnace (FIGS. 4 and 5)

Either one of the methods is applied to the mold core in the phase wherein the covering step (1) has been completed. To put it another way, this is the core to which rough processing has been applied to such an extent that layers have been laminated and the core is ready to be built into the base mold. In this phase, however, the high-precision processing is not yet applied to the surface treatment layer 15. The core under this condition is referred to as a rough processed core 21 hereinafter.

In the first place, the following describes the dummy molding (A) as a first example of the processing method in pressurizing step (2). Before performing this processing, each rough processed core 21 is built into the fixed side base mold 22 and movable side base mold 23 of the injection molding machine, with each molding surface facing the other, as shown in FIG. 3. Thus, the molding face of the rough processed core 21 built into the fixed side base mold 22 is located on the left side of the drawing, while the molding face of the rough processed core 21 built into the movable side base mold 23 is located on the right side. This arrangement allows a dummy cavity devoid of high-quality shape to be formed between these molding faces.

After that, the base molds 22 and 23 are clamped as shown in FIG. 3, and molten resin is injected therein. Then the same procedures as those in the normal injection molding operation are followed. Thus, the pressure of the resin having been injected is applied to the dummy cavity having been formed. As shown in FIG. 3, the rough processed core 21, except for the molding face thereof, is covered by the bases 22 and 23. Accordingly, only the molding face is pressurized by the molten resin in the direction of the arrow in FIG. 3.

The rough processed core to be built therein intrinsically is preferably built into each of the base molds. However, this core need not be one of the intrinsic pair if it can be built therein. In FIG. 3, the same rough processed cores 21 are built into the base molds 22 and 23. However, they are different in general cases. The same rough processed core 21 can be built therein if possible. FIG. 3 shows two sets of rough processed cores 21 (i.e., four cores in total). The number of the cores can be increased or decreased in conformity to the type of the base molds 22 and 23.

The following describes the molding conditions in dummy molding (A). The molding condition is assumed to meet the pressurizing condition in pressurizing step (2). Namely:

Resin pressure: 30 through 400 MPa

Pressure application time per shot by number of shots: 10 minutes through 40 hours (total pressure application time)

Resin temperature: minimum temperature allowing injected through 400° C.

For example, the following conditions are preferably used:

Resin pressure: 80 through 150 MPa

Pressure application time: 8 through 20 sec (per shot)

Number of molding shots: 1,000 through 2,500

Resin temperature: 200 through 300° C.

The resin pressure in the dummy processing should be equal to or higher than that under normal molding conditions. For example, the resin pressure is about 100 MPa. This pressure can be higher. For example, the pressure is preferably about 30 MPa higher than that under normal molding conditions. Continuous dummy molding operation of 1,000 through 2,500 shots—e.g., about 2,000 shots—is performed.

Further, the pressure application time per shot is preferably equal to or longer than the pressure application time per shot in the normal molding mode. The injection molding machine cannot maintain a long duration of time when the resin pressure is kept applied to the molding face due to the gate seal caused by the solidification of a molten molding material. However, it is possible to utilize the entire time when the applied pressure is maintained by pressurization after solidification.

The resin material used in this case is preferably the same as the resin used in the actual molding operation. However, since the resin used for the optical element is generally costly, other similar resins can be employed, if the similar molding conditions can be obtained. The resin temperature can be the temperature commonly used in the normal molding operation.

The following describes an example of the molding conditions meeting the aforementioned requirements:
  Resin material: COP (cycloolefin polymer)
  Mold temperature: 120° C.
  Resin temperature: 280° C.
  Resin pressure: 100 MPa
  Pressure application time: 17 sec (per shot)
  Number of molding shots: 2,000

COP was used as the resin material. The aforementioned mold temperature and resin temperature are given by way of an example, and can be changed in conformity to the type of resin.

The following describes an example of the normal molding conditions using this resin material:
  Resin material: COP (cycloolefin polymer)
  Mold temperature: 120° C.
  Resin temperature: 280° C.
  Resin pressure: 70 MPa
  Application time: 15 sec (per shot)

Namely, in the example of the present embodiment, only the normal molding conditions, resin pressure, and application time are changed.

If continuous dummy molding operation of 1,000 or more shots is performed under the conditions changed as shown above, pressure meeting the pressurizing conditions in the pressurizing step (2) is applied to the molding face of the rough processed core 21. Thus, the heat insulating layer 13 can be deformed almost to its limit in advance. Further, in this processing method, the pressure being used in the pressurizing step is applied to the rough processed core 21 in the direction approximately perpendicular to the molding face, similar to the case of normal molding operations. Thus, the heat insulating layer 13 is sufficiently compressed in the direction of molding. This procedure provides a core which is subjected to almost no deformation in the subsequent continuous molding operation.

The following describes the process of holding in the pressurizing furnace (B), as a second example of the pressurizing step (2). To perform this processing, a pressurizing furnace is used as a pressurizing container. As shown in FIG. 4, the rough processed core 21 is placed in the pressurizing furnace 24, and pressure is applied inside the pressurizing furnace 24. This procedure allows pressure to be applied to the rough processed core 21 from all directions, as shown by the arrows in the drawing. The pressurizing furnace 24 can be any one of a water hydraulic pressure type, oil hydraulic pressure type, and pneumatic type. Further, pressurization and heating can be provided at the same time, using the pressurizing furnace 24 wherein a rise in temperature is permitted.

The pressurizing conditions for the process of holding in the pressurizing furnace (B) are exemplified as follows:
  Pressurizing medium temperature: 25° C.
  Applied pressure: 100 MPa
  Application time: 30 minutes These conditions make it possible to apply the pressure meeting the pressurizing conditions in the pressurizing step (2). This allows the heat insulating layer 13 to be kept sufficiently compressed in advance.

A properly applied pressure can be selected within the range from 30 through 400 MPa. Accordingly, the application time can be properly modified by 10 minutes or more. Generally, when the applied pressure is high, the application time can be shorter. In the above example, the medium pressurizing temperature is 25° C. This temperature can be selected in the range of 20 through 400° C. When the process of holding in the pressurizing furnace (B) is performed, it is possible to use a core wherein only the layers are laminated, and the rough processing that allows the core to be built into the base mold is not yet completed.

Alternatively, in the process of holding in the pressurizing furnace (B), the surfaces except for the molding face of the rough processed core 21 are covered with the cover member 25 and the core is held in the pressurizing furnace 24, as shown in FIG. 5. If this procedure is used, the pressure applied to the position other than the molding face is received by the cover member 25. Thus, pressure is applied only to the molding face of the rough processed core 21. Then compression and deformation are applied only in the direction approximately perpendicular to the molding face, as in the case of dummy molding (1). This arrangement effectively prevents a change in shape from occurring in the subsequent molding operation.

As described above, a proper pressure can be applied to the rough processed core 21 by the process of holding in the pressurizing furnace (B). This makes it possible to cause deformation almost to its limit in advance. This provides a mold for molding an optical element 10 that is subjected to almost no deformation in the subsequent molding operation. This method does not perform molding operation, and does not require resin.

As has been described in detail, according to the optical element producing mold of the present embodiment, a core is pressurized prior to high-precision processing and the heat insulating layer 13 is compressed in advance. After that, the high-precision processing step is taken. Thus, almost no further change in shape occurs due to the continuous molding operation. This arrangement provides a mold for molding an optical element wherein a change in the shape of the heat insulating layer is prevented even during the continuous molding operation and high-precision transferability is ensured.

The present embodiment has been described by way of an example, without the present invention being restricted thereto. Thus, the present invention can be embodied in a great number of variations with appropriate modifications or additions, without departing from the technological spirit and scope of the invention claimed.

For example, a rough processing step for rough-processing the surface of the covering layer can be performed between the covering step (1) and pressurizing step (2). The shape of the optical element producing mold 10 and the thicknesses of the layers shown in the drawing are given by way of an example, without the present invention being restricted thereto.

What is claimed is:

1. A method for manufacturing a mold for molding an optical element, wherein the mold comprising a base material having a molding base face and a covering layer provided on the molding base face of the base material, the covering layer comprising a heat insulating layer including ceramics, and an upper surface portion of the covering layer located above the molding base face forms a molding face, the method comprising:

a covering step for forming a covering layer on the molding base face of the base material to make a rough processed core;

a pressurizing step for pressurizing a surface of the covering layer of the rough processed core, and facilitating a deformation of the heat insulating layer for suppressing the deformation during a continuous molding of the optical element; and a high-precision processing step for applying high-precision processing onto the surface of the covering layer subsequent to the pressurizing step, to precisely shape the molding face.

2. The method for manufacturing a mold for molding an optical element according to claim 1, and the pressurizing step is implemented on conditions that:

an applied pressure is within the range from 30 through 400 MPa;

a total time of applying the pressure is 10 minutes or more; and an environmental temperature of the rough processed core during the pressurizing step is kept within the range from 20° C. through 400° C.

3. The method for manufacturing a mold for molding an optical element according to claim 1, wherein dummy molding is performed in the pressurizing step in such a way that the rough processed core is fitted together with a counterpart member in a molding apparatus, a molten molding material is injected into a molding space, and pressure is applied.

4. The method for manufacturing a mold for molding an optical element according to claim 3 and the pressurizing step is implemented on conditions that:

an applied pressure is equal to or higher than a pressure applied in a normal molding mode;

a number of shots is 1,000 or more; and a pressure application time per shot is equal to or longer than the pressure application time per shot in the normal molding mode.

5. The method for manufacturing a mold for molding an optical element according to claim 4 wherein the number of shots is 2,000 or more in the pressurizing step.

6. The method for manufacturing a mold for molding an optical element according to claim 1 wherein, in the pressurizing step the rough processed core is placed inside a pressurizing container, and pressure is applied inside the pressurizing container.

7. The method for manufacturing a mold for molding an optical element according to claim 6 wherein, in the pressurizing step, pressure is applied in a state that a surface of the rough processed core, except for where the molding face will be positioned, is covered with a covering member which covers and holds the rough processed core in the pressurizing container.

8. The method for manufacturing a mold for molding an optical element according to claim 2 wherein, in the pressurizing step the rough processed core is placed inside a pressurizing container, and pressure is applied inside the pressurizing container.

9. The method for manufacturing a mold for molding an optical element according to claim 8 wherein, in the pressurizing step, pressure is applied in a state that a surface of the rough processed core, except for where the molding face will be positioned, is covered with a covering member which covers and holds the rough processed core in the pressurizing container.

10. The method for manufacturing a mold for molding an optical element according to claim 1, wherein the high-precision processing is selected from among a cutting operation, shaping operation, and a polishing operation.

11. A method for manufacturing an optical element, comprising:

manufacturing a mold for molding an optical element according to the method of claim 1; and molding the optical element using the mold.

* * * * *